United States Patent [19]

Hsiung

[11] Patent Number: 4,547,286
[45] Date of Patent: Oct. 15, 1985

[54] WATER FILTRATION PROCESS AND APPARATUS HAVING UPFLOW FILTER WITH BUOYANT FILTER MEDIA AND DOWNFLOW FILTER WITH NONBUOYANT FILTER MEDIA

[75] Inventor: Andrew K. Hsiung, Corvallis, Oreg.

[73] Assignee: Neptune Microfloc, Inc., Corvallis, Oreg.

[21] Appl. No.: 465,524

[22] Filed: Feb. 10, 1983

Related U.S. Application Data

[63] Continuation-in-part of Ser. No. 171,151, Jul. 22, 1980, abandoned.

[51] Int. Cl.⁴ .............................................. B01D 37/00
[52] U.S. Cl. ....................................... 210/738; 210/786; 210/792; 210/796; 210/274; 210/276; 210/279; 210/284; 210/286
[58] Field of Search ................ 210/786, 798, 792–796, 210/807, 284, 286, 616–618, 738, 269, 274–280

[56] References Cited

U.S. PATENT DOCUMENTS

| | | |
|---|---|---|
| 468,984 | 2/1892 | Boeing . |
| 1,403,311 | 1/1922 | Gaillet . |
| 2,057,887 | 10/1936 | Elliott et al. ............... 210/513 X |
| 2,069,621 | 2/1937 | Patrick .................... 210/794 |
| 2,233,981 | 3/1941 | Jewell ..................... 210/279 |
| 2,353,602 | 7/1944 | Trotter .................... 210/83 X |
| 2,572,848 | 10/1951 | Fitch . |
| 2,715,964 | 8/1955 | Martin . |
| 2,742,381 | 4/1956 | Weiss et al. . |
| 2,758,070 | 8/1956 | Yurko . |
| 2,925,382 | 2/1960 | Kent et al. . |
| 3,122,594 | 2/1964 | Keilback . |
| 3,232,434 | 2/1966 | Albersmeyer . |
| 3,293,174 | 12/1966 | Robjohns .............. 261/DIG. 72 X |
| 3,305,096 | 2/1967 | Schleiss . |
| 3,343,680 | 9/1967 | Rice et al. ............... 210/203 |
| 3,424,674 | 1/1969 | Webber ................... 210/275 |
| 3,459,302 | 8/1969 | Ross ...................... 210/276 X |
| 3,557,955 | 1/1971 | Hirs et al. ................ 210/500 R X |
| 3,635,764 | 1/1972 | Setser et al. ............. 210/65 X |
| 3,671,426 | 6/1972 | Orcutt et al. . |
| 3,701,423 | 10/1972 | Lindstol ................. 210/798 X |
| 3,770,131 | 11/1973 | Davis et al. .............. 210/532 A X |
| 3,948,767 | 4/1976 | Chapman ................. 210/20 |
| 3,956,128 | 5/1976 | Turner ................... 210/150 |
| 4,052,300 | 10/1977 | Mosso .................... 210/786 |
| 4,062,775 | 12/1977 | Pielkenrood ............. 210/189 |
| 4,100,070 | 7/1978 | White et al. ............. 210/279 X |
| 4,115,266 | 9/1978 | Oshima ................... 210/807 X |
| 4,125,467 | 11/1978 | Haddad et al. ........... 210/83 |
| 4,198,301 | 4/1980 | Iwatani . |
| 4,290,894 | 9/1981 | Torok . |
| 4,420,403 | 12/1983 | Tufts ..................... 210/807 X |
| 4,427,555 | 1/1984 | Brown et al. ............. 210/807 X |

FOREIGN PATENT DOCUMENTS

| | | |
|---|---|---|
| 833327 | 4/1960 | United Kingdom . |
| 1147054 | 4/1969 | United Kingdom . |
| 1204880 | 9/1970 | United Kingdom ........ 210/65 |
| 1264782 | 2/1972 | United Kingdom . |
| 1305399 | 1/1973 | United Kingdom . |
| 1317433 | 5/1973 | United Kingdom . |
| 2021428 | 12/1979 | United Kingdom . |

OTHER PUBLICATIONS

Simmers, "Bouyant Media Filter", *Proceedings, 40th International Water Conference*, pp. 25–27.
Oshima, "Amendment Under Rule 312", File History of U.S. Pat. No. 4,115,266, issued Sept. 1978.

*Primary Examiner*—Thomas Wyse
*Attorney, Agent, or Firm*—Klarquist, Sparkman, Campbell, Leigh & Whinston

[57] ABSTRACT

High rate filtration system includes an upflow filter vessel containing a bed of buoyant media followed by a downflow filter vessel containing a bed of nonbuoyant media. The upflow filter vessel is unobstructed by cross-sectional, media-confining screens. A horizontal trough structure collects filter effluent and makes it possible to clean the bed by diffusing air into the liquid below the bed so that average fluid density in the bed is reduced. The reduction in fluid density results in expansion of the bed as media particles descend by gravity.

20 Claims, 20 Drawing Figures

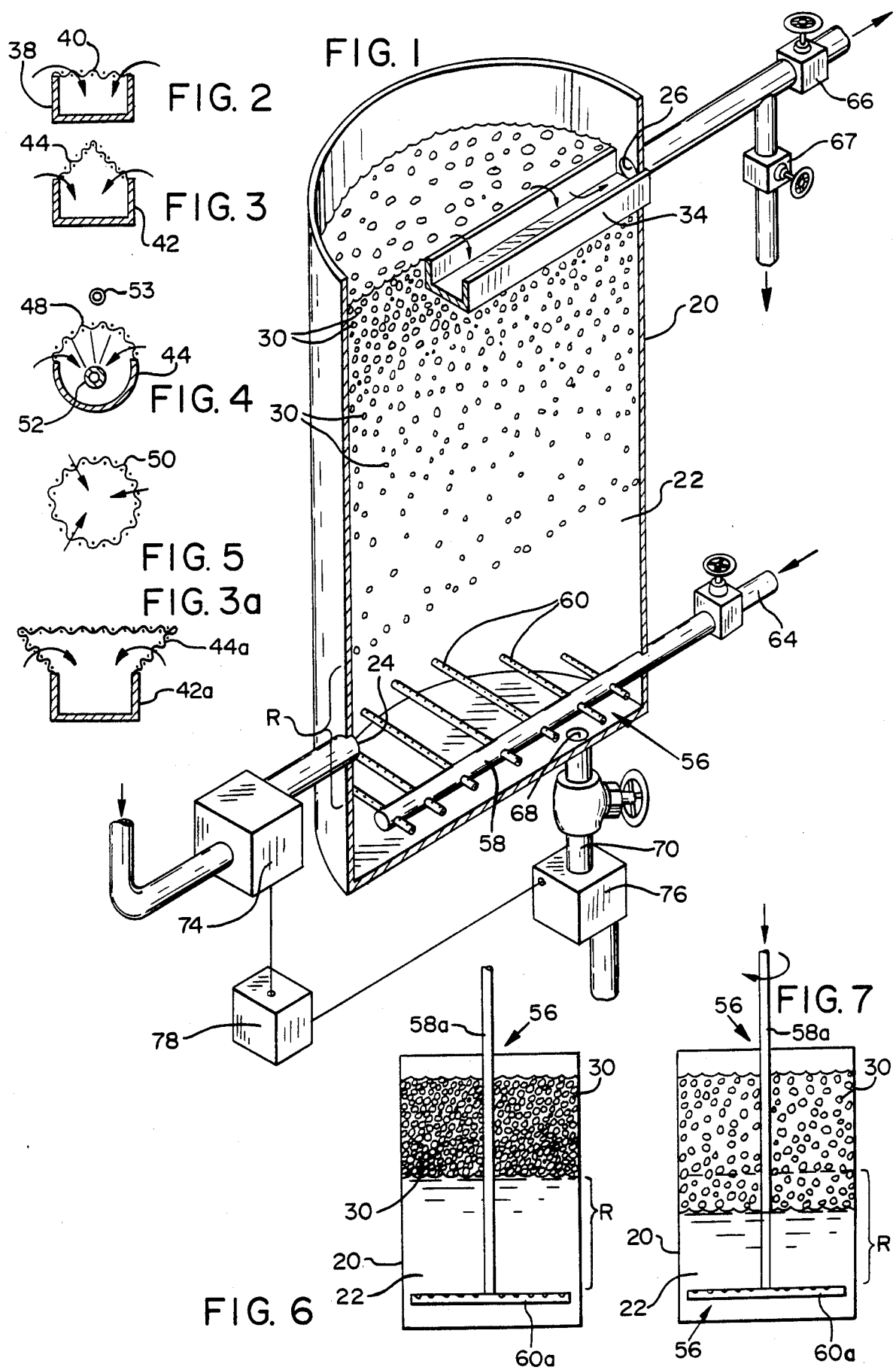

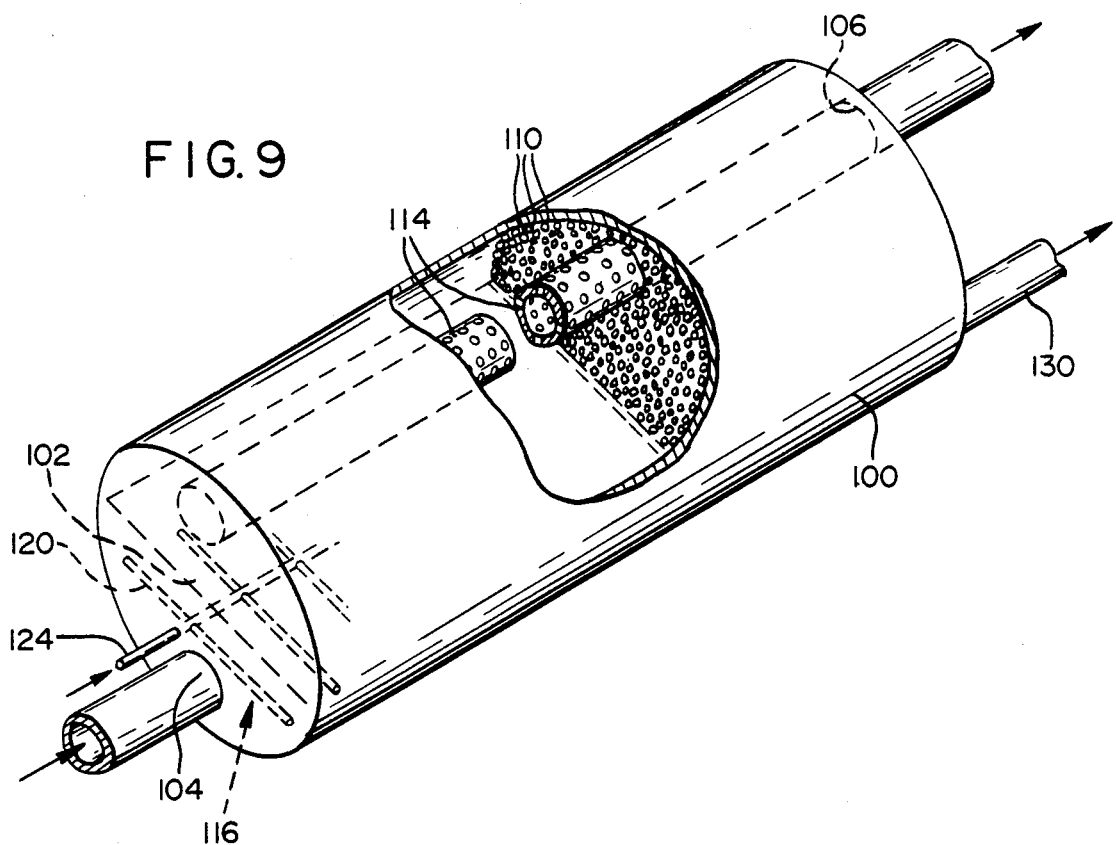
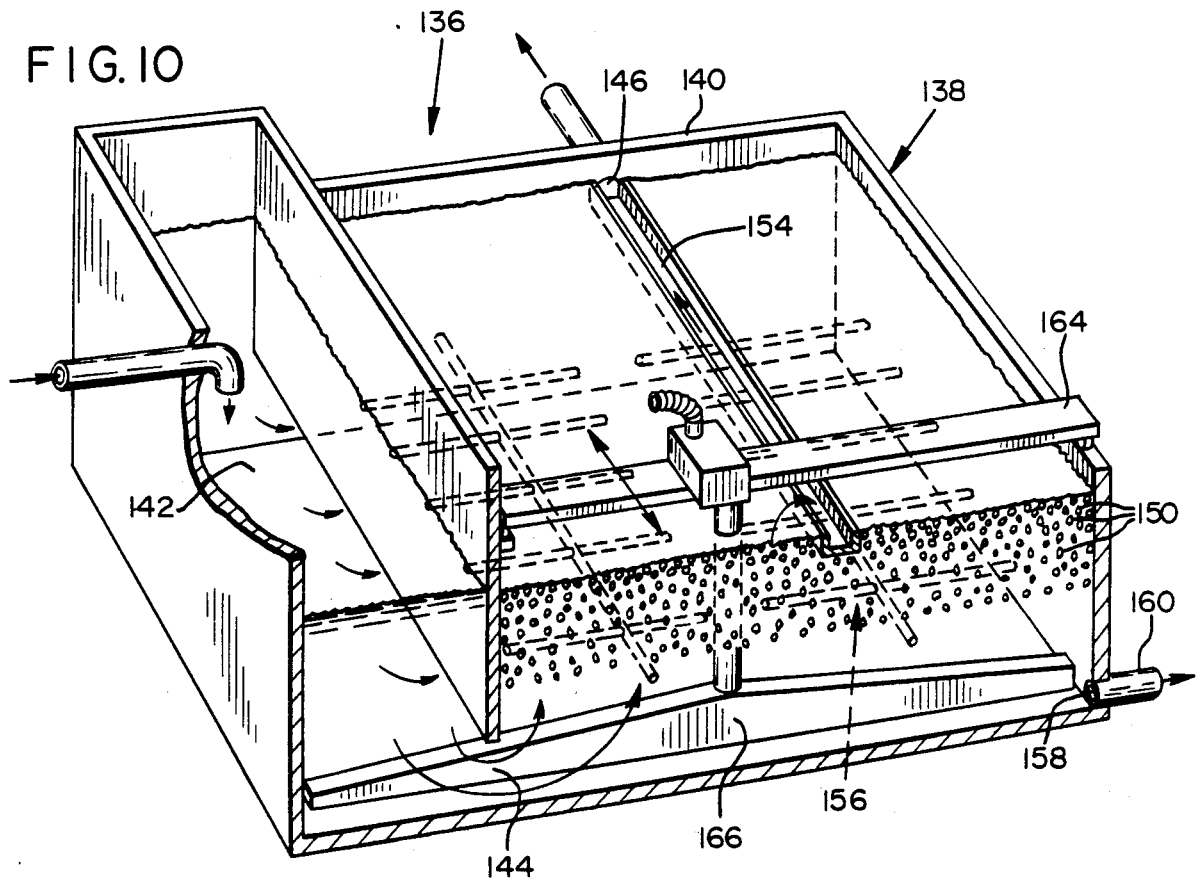

——— WASH RATE AT 22.6 GPM/SQ. FT.
- - - - WASH RATE AT 17.0 GPM/SQ. FT.
-·-·- WASH RATE AT 8.5 GPM/SQ. FT.

WATER FILTRATION PROCESS AND APPARATUS HAVING UPFLOW FILTER WITH BUOYANT FILTER MEDIA AND DOWNFLOW FILTER WITH NONBUOYANT FILTER MEDIA

CROSS REFERENCE TO RELATED APPLICATION

This is a continuation-in-part application of copending U.S. application Ser. No. 171,151, filed July 22, 1980, of Andrew K. Hsiung, now abandoned.

BACKGROUND OF THE INVENTION

The present invention relates to methods and apparatus for purification of water by filtration. More specifically, it concerns filtration systems with an upflow filter which contains a buoyant filter media in series with a downflow filter which contains a nonbuoyant filter media. In addition, the invention also concerns upflow filters with a buoyant filter media used in such a system.

It has been known for some time that water can be filtered by passing it upwardly through a bed of filter media comprising grains or small pellets of a buoyant material. An early example is shown in U.S. Pat. No. 468,984 of Boeing, issued in 1892, in which wood cubes are utilized for the buoyant material. Buoyant media out of synthetic materials such as polyethylene have also been used. Such a filtration method is also shown in United Kingdom patent specification No. 833,327 to Smith. A related upflow filtration process is described in Example 4 of U.S. Pat. No. 3,343,680 (Rice et al.).

These filters are contained within substantially closed tanks or in tanks internally divided by screens to prevent escape of the buoyant media. This makes the filtration zones and media beds inacessible during filtration, thereby limiting control over the filtration process. These filters also lack effective methods of cleaning the media in them. Backwashing of such filters has proved to be wasteful of energy, finished water and time since a very large downward flow of liquid is required before the media particles will separate. Mechanical agitation of the media, as described in the Smith specification, enhances cleaning, but requires a wasteful consumption of energy in order to sufficiently agitate a packed media bed that impurities are released.

Still another example of a buoyant media filter is shown in U.S. Pat. No. 4,115,266 of Ohshima. In Ohshima, air is injected through small holes in a pipe below the filter bed for backwashing the filtering materials or aeration of adhered purifying bacteria. Ohshima also mentions arranging his filters in series, but is apparently only concerned with filters operating at very slow rates so as to permit growth of oily matters and suspended substances on the surfaces of the buoyant media particles. Faster flow rates are understood to tend to agitate the media bed and interfere with this approach to filtering.

Although buoyant media filters have been known for at least close to a century, they have heretofore been used in relatively low flow rate applications because a practical method and apparatus for using such filters in a high rate water treatment plant was previously unknown.

SUMMARY OF THE INVENTION

It has now been discovered that a high rate efficient water filtering system and method of water filtration is provided by an upflow filter containing a buoyant media in series with a downflow filter containing a nonbuoyant media. Surprisingly, high quality filtered water is produced by such a system at flow rates on the order of ten gallons per minute per square foot of filter area, well above the water treatment industry standard of five gallons per minute per square foot for filtration systems.

In addition, in such a system and method, a pretreatment settling tank or clarifier is eliminated in most applications. The system is capable of receiving raw water and chemicals, such as coagulants, injected directly into the raw water stream ahead of the first filter. Flocculation then takes place in the buoyant media filter so that it performs the function of an adsorption clarifier. Fewer coagulants and other chemicals are required woth this system in comparison to systems using a separate settling type clarifier section. Also, closer control of coagulant and other chemicals is attainable because conditions, such as turbidity of the influent and effluent, can be monitored and the results used to establish chemical doses.

It has also been found that partial cleaning of the buoyant media filter with less frequent full cleaning of the nonbuoyant media filter is surprisingly all that is apparently required to maintain the efficient operation of the system. The filters are typically cleaned after a predetermined time, or after a predetermined head loss is sensed across their media beds. Air and flush water are used to clean the buoyant media filter. Because only partial cleaning of the buoyant media filter is needed, less time, flush water, air and energy is required during cleaning. Also, flocculation of material from the influent water is enhanced within the buoyant media filter, and hence less chemicals are required, because of the contact of the raw water with previously deposited solids remaining in the filter after cleaning.

In one specific embodiment of the system, the buoyant media filter and nonbuoyant media filter are separated by a common well or compartment. During normal operation of this system, pretreated water from the buoyant media filter flows through the well and to the nonbuoyant material filter. During cleaning, solids removed from the buoyant media filter pass into and are removed from the well without reaching the nonbuoyant media filter. The nonbuoyant media filter is also backwashed into the well during cleaning. With this construction, a compact, easily cleaned filtration system is provided.

It has also been found that it is possible to provide trough-type liquid collectors to remove filtered water from the effluent side of an upflow buoyant media filter. The use of such a collector makes it possible to improve the accessability to the filter apparatus by eliminating any top covering or screen when used in an appropriately shaped filter vessel. This arrangement allows for the incorporation of movable mechanisms which can extend from the exterior to the interior of the tank for free motion therethrough without the use of complicated seals or tortured screening arrangements.

The nature of buoyant media particles used in a filter bed has a substantial impact on the flow rate, solids capture rate and cleanability of the bed. Particularly significant are the shape and size of the media particles. Irregular, angularly shaped particles are found to have significant advantages.

It is also discovered that a relatively gentle cleaning procedure can be used if the media is sufficiently close in specific gravity to the specific gravity of water. Air bubbles dispersed throughout water flowing into the bed cause the overall specific gravity of the water and air mixture to fall to a level below that of the media in the bed so that the bed uniformly expands downwardly, thereby releasing trapped impurities without mechanical agitation.

Free standing filters according to this invention are particularly advantageous because they can be constructed in any desired exterior configuration or shape. The size of such a filter depends only on the amount of liquid to be filtered in a given amount of time.

It is one object of the invention to provide an improved water filtration system and method.

It is another object of the invention to incorporate a buoyant media filter in a high-rate water filtration system.

It is a further object of the invention to provide a water filtration system and method which minimizes the time, flush water, and energy required during cleaning.

Still another object of the invention is to provide a water filtration system and method in which a settling type clarifier is eliminated.

Another object of the invention is to provide a water filtration system and method which enhances flocculation while reducing the chemicals required for flocculation.

A further object of the invention is to provide a compact water treatment system.

Another more specific object of the invention is to provide a multi-stage passive water treatment system in which expensive control valves and other complex mechanical elements are eliminated between the influent inlet and effluent outlet of the system and which is easy and efficient to clean as desired.

It is also an object of this invention to provide a filter for such a system which is easily accessible for inspection, treatment by mechanical apparatus inserted from the exterior, and for viewing and maintenance purposes.

Another object is to provide such a filter which can operate at a high flow rate and which rapidly can be cleaned and returned to service after cleaning.

Another object is to provide an apparatus which can be cleaned easily and automatically.

A related object is to provide a plurality of such filters or systems which operate in tandem so that filtering processes can proceed uninterrupted while one filter unit is being cleaned.

A further object is to provide such a filter for use in virtually any location, the filter being a free standing unit which will operate with or independently of other associated equipment and which can be built in any size or shape.

These and other features, objects and advantages of the present invention will be apparent from the following detailed description thereof and from the attached drawings.

In the drawings:

FIG. 1 is a perspective view of a filter apparatus according to the present invention shown in vertical section;

FIG. 2 is a sectional side elevation of a collector trough shown in FIG. 1;

FIG. 3 is a sectional side elevation of a first alternate embodiment of the trough shown in FIG. 2;

FIG. 3a is a sectional side elevation of a second alternate embodiment of the trough shown in FIG. 2;

FIG. 4 is a sectional side elevation of a third alternate embodiment of the trough shown in FIG. 2;

FIG. 5 is a sectional side elevation of a fourth alternate embodiment of the trough shown in FIG. 2;

FIG. 6 is a schematic sectional side elevation of a filter according to the present invention with its bed in the operating position;

FIG. 7 is a schematic sectional side elevation of the apparatus shown in FIG. 6 with the bed expanded during cleaning;

FIG. 9 is a perspective view of a horizontally oriented filter according to the present invention with a portion of the outer casing broken away to show interior detail;

FIG. 10 is a perspective view of a filter according to the present invention incorporating suction sludge removal apparatus;

DETAILED DESCRIPTION OF FILTER OF FIG. 1

Figure 8:
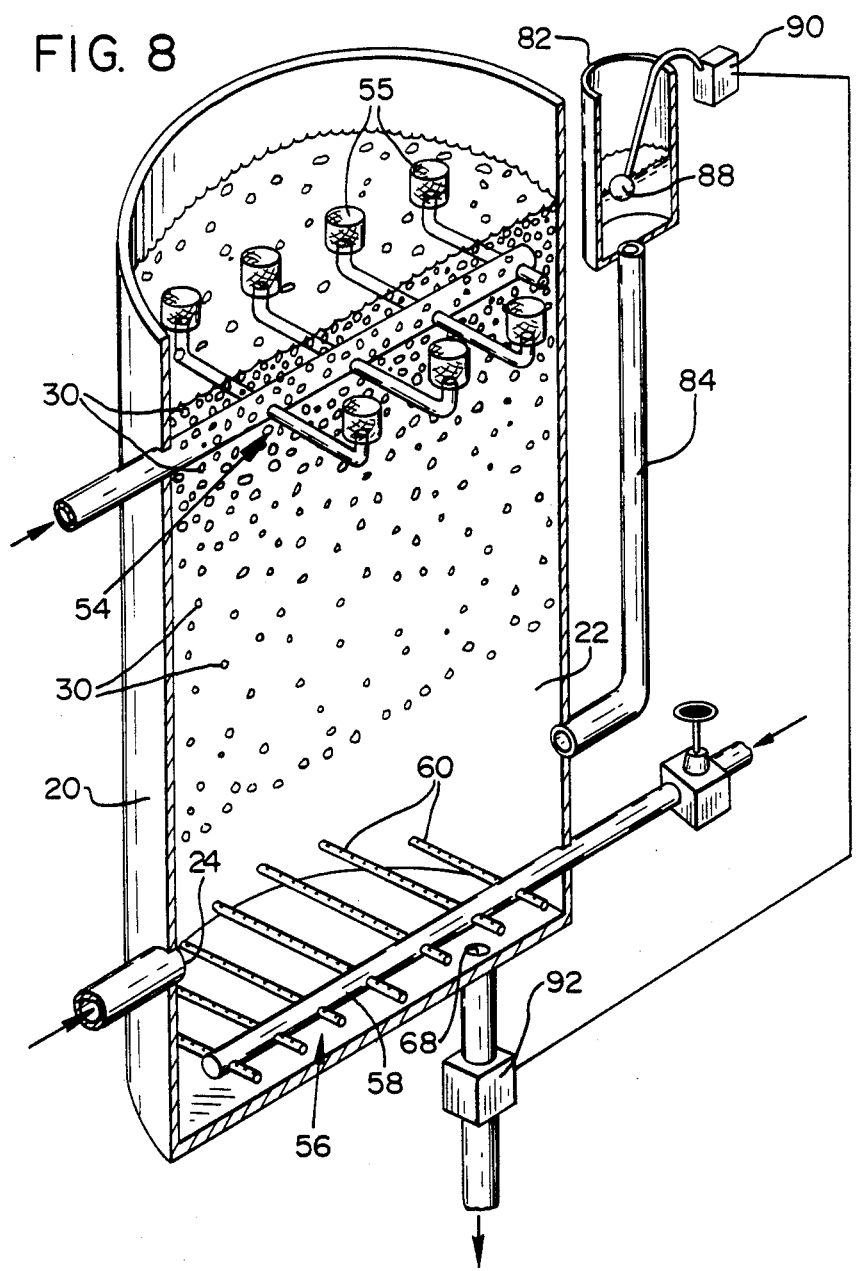
FIG. 8 is a perspective view of the filter apparatus of FIG. 1 incorporating another effluent collector and flow controller.

As shown in FIG. 1, a filter vessel 20 provides an internal passageway 22 for water moving therethrough. An inlet 24 is provided near the base of the vessel 20 for supplying influent water into the passageway 22 and an outlet 26 is located near the top of the vessel for removing filtered water from the passageway 22.

Located between the inlet 24 and outlet 26 is a bed of buoyant media particles 30 on which impurities collect as water to be filtered moves upwardly through the bed. This media must have a specific gravity less than that of water and, for the reasons described below, should have a specific gravity no less than 0.80. Most preferably, the media particles should have a specific gravity no less than 0.96.

To achieve effective filtration, a media of proper characteristics will be chosen depending upon the nature of the water to be filtered. For example, the media should have an effective size between two and twenty millimeters; but optimal filtration of storm water or effluent from a biological treatment clarifier, requires a media having an effective size between about 2.0 and 10.0 millimeters in diameter. The particles will have a uniformity coefficient no greater than 2.0 and sphericity of less than 0.7.

Water is filtered by passing it upwardly through the bed of such particles 30 and is collected in a horizontal collector apparatus 34 which delivers the filtered water to the outlet 26. To allow for access and ease of cleaning, the collector 34 should extend horizontally into the filter vessel at a location near the top thereof without impeding flow through the entire cross section of the vessel. However, the collector should be capable of receiving liquid at multiple locations in the cross section of the passageway 22 without loss of media particles. And yet the collector should be such that the filter can be established in an uncovered tank for ease of access.

Collector Apparatus

Collectors can be constructed in a number of advantageous configurations, FIGS. 1-5 and 8 illustrating most preferred arrangements. In FIG. 2, a solid channel 38 is covered by a flat screen 40. While in FIG. 3, a similar channel 42 is covered by an arched screen 44. The arched screen is preferred since it is entirely self supporting and will not collapse even if, for some reason, a substantial amount of the filter media particles 30 climbs over the trough 42.

A screen 44a, which flares upwardly from a trough 42a is shown in FIG. 3a. This arrangement is desirable because media and other solids tend to fall outwardly and downwardly from the sides of the screen 44a. It is almost impossible for media to climb over the screen, and the screen is less subject to plugging than in most other collector types.

FIG. 4 shows another alternate trough embodiment. This trough is substantially tubular in cross section, and includes a lower hemicylinder made of a solid material 46 and an upper hemicylinder or arch made of screening 48. In FIG. 5, the trough constitutes a tubular screen. Another variation (not shown), is a perforated tube with screen covered openings.

Any of the troughs can include means for automatically cleaning the screen should it become clogged either with media or debris. As illustrated in FIG. 4, a tube 52 can extend through the interior of the trough and include spray orifices at periodical intervals. Should the screens become clogged, pressurized water is delivered to the interior of the tube 52 to form spray jets which backwash the screen as illustrated.

As an alternative, one or more external tubes 53 can supply water for jets which spray onto the exterior of the screen to wash off adhering solids.

A somewhat different collector, as shown in FIG. 8, comprises a pipe manifold 54 having a plurality of collector heads 55 located in a common horizontal plane. The heads 55 are made of screen and surround the inlets to the manifold 54 so that filter effluent can flow into the manifold inlets while buoyant media particles 30 are held back by the heads.

All of the illustrated collector trough arrangements avoid norizontal, cross-sectional, media-retaining screens and thus allow easy access, through the top of the filter vessel, to bed and region therebelow. Furthermore, the collector arrangement is compatible with effective methods and apparatus for cleaning upflow filters of the type illustrated.

As previously mentioned, cleaning the media particles can be a substantial problem in this type of filter. And, the availability of a practical cleaning method is essential to filter operability.

Cleaning the Buoyant Media Bed

In the present invention, cleaning is accomplished by periodically dispersing gas bubbles throughout liquid in the filter bed. The amount of gas provided is selected to be just sufficient to reduce the density of the fluid in the passageway 22 to below the density of the particles 30 which make up the bed so that at least some of the media particles descend by gravity and the filter bed expands in volume. As the bed expands, media particles separate from one another, allowing trapped impurities to move outwardly from the bed to be collected and discarded.

To effectively accomplish the dispersion of gas into liquid in the bed, the apparatus of FIG. 1 includes a gas injection mechanism 56 located inside the vessel 20 beneath the bed of particles 30. The injection mechanism is a manifold having a feeder pipe 58 connected to lateral delivery tubes 60. When air is introduced into the manifold through an air intake line 64, air bubbles are produced at the numerous orifices located in the tubes 60 throughout the cross section of the passageway 22 so that, during cleaning, the fluid within the passageway 22 is an air-water mixture. By dispersing bubbles of air throughout the fluid in the passageway 22, bed expansion is substantially uniform at each horizontal cross section of the passageway 22.

A different gas injection mechanism 56a is shown in FIGS. 6 and 7. This mechanism includes a vertical feeder pipe 58a on which are mounted perforated delivery tubes 60a. This mechanism is constructed so that the tubes 60a revolve horizontally to dispense air bubbles throughout the passageway 22 when pressurized air is supplied through the pipe 58a.

Regardless of the vessel or collector used, region R is provided between the bottom of the bed of particles 30 and the air distribution manifold. This region R must be unobstructed by screens or other structures which would limit downward movement of the media particles. It must also be of sufficient volume to allow the bed to expand downwardly during cleaning to the extent that trapped impurities in the bed are released.

A comparison of a bed before and during cleaning is found in FIGS. 6 and 7. FIG. 6 shows a bed in the normal unexpanded condition which exists during normal filtration. During cleaning the bed is expanded as illustrated by FIG. 7, which shows a partially expanded bed.

When air is introduced through the manifold, the media particles 30 descend, usually to the extent that the lowest particles of the bed are located immediately above the manifold. Particles will typically fill the region R when the bed is expanded, but will not descend below the air manifold since liquid below that level remains at a greater density than the media.

To achieve effective cleaning with a minimum of procedural steps, it is advantageous to prevent all flow of liquid through the outlet 26 during cleaning of the bed. This is accomplished by closing valves 66, 67 provided in lines extending from the outlet 26. In most open vessels, however, the valves 66, 67 cannot be closed without simultaneously diverting the influent to prevent the open filter vessel from overflowing. Even in a closed vessel, merely closing the outlet 26 would not be acceptable because it would cause water to back up at some location upstream of the filter bed.

To divert the filter influent, a drain outlet 68, connected with a drain line 70 is provided to remove water from the passageway 22. During expansion of the bed, the impurities trapped in the bed are separated, descend by gravity and are carried out of the vessel through the open drain outlet 68.

Valves controlling the drain line 70 can be opened to match continued flow through the inlet 24. Removal of liquid through a drain can, however, create problems since it is not only essential to keep liquid from flowing over the top of the vessel 22, but also important to prevent media particles 30 from being carried outwardly through the drain.

Screens can be placed over the outlet 68; but these are prone to rapid clogging during draining. In the filters according to the present invention, therefore, the drain outlet 68 is located at a position at least one foot below the air delivery tubes 60 of the manifold 56. This positioning prevents media from descending to the level of the outlet 68 even when the bed is at its maximum expansion. Also, a mechanism is provided to automatically match the flow entering through the inlet 24 to the flow of liquid exiting through the drain line 70 so that the media bed remains at the surface.

In the apparatus of FIG. 1, such automated flow-matching is accomplished by means of a flow meter 74 to measure the rate at which influent is entering the filter vessel 22. A combined flow meter and automatically actuated valve 76 is incorporated in the drain line 70. A processor 78 is connected between the entrance flow valve 74 and exit flow valve 76 to continuously monitor and compare the rate of inflow and outflow. If the rate of inflow becomes out of balance with the rate of outflow, the processor 78 signals the automatically actuated valve 76 to open or close an appropriate amount to balance the flow. In this manner, the level of water in the vessel 22 is maintained at a substantially constant level, even during cleaning while the bed is expanded.

FIG. 8 shows another automatic control system for maintaining a substantially constant level of liquid in the vessel during cleaning with the effluent line closed. In this embodiment, a float valve chamber 82 is connected by a pipe 84 to the interior of the vessel 20 so that liquid in the chamber 82 is always at the same level as liquid inside the passageway 22. A float 88 inside the vessel 82 connects to an automatic valve controller 90.

If the level of liquid inside the chamber 82 falls below a predetermined level during cleaning of the filter, the controller 90 automatically closes a valve 92 in the drain line 70 which causes the level of liquid to rise in both the vessel 20 and chamber 82. The control may also be constructed so that if the float 88 exceeds a predetermined maximum level in the chamber 82, the controller 90 signals the valve 92 to open, thereby draining liquid from the vessel until an acceptable reduced level is reached.

Figure 11:
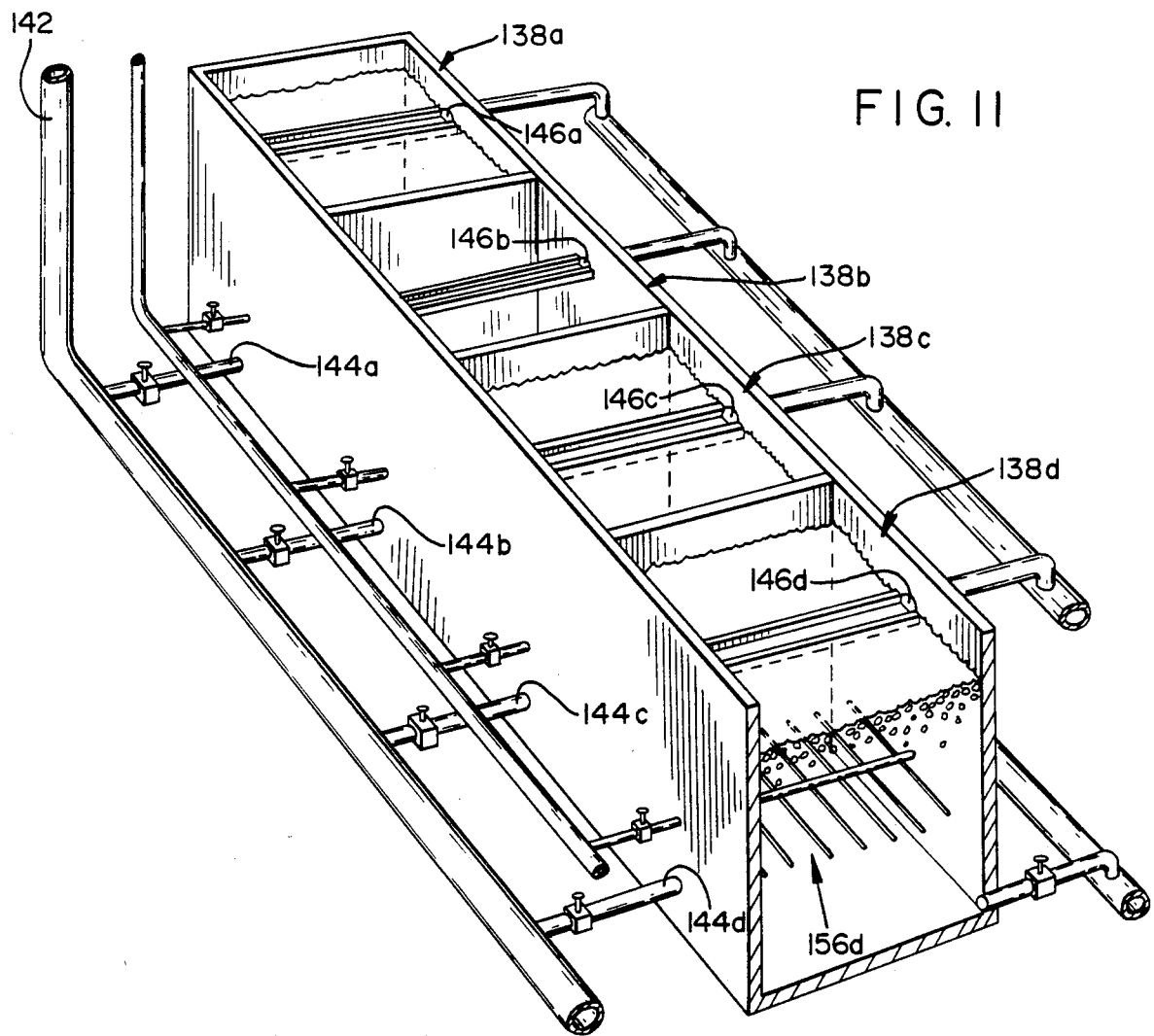
FIG. 11 is a perspective view of a multi-compartment filter apparatus according to the present invention shown in vertical section.

Buoyant Media Filters of FIGS. 9 and 11

A filter according to the present invention can be constructed in a variety of configurations other than the open-topped, vertical, circular cylinder shown in FIGS. 1 and 8. For instance, FIG. 9 shows a vessel 100 which is a substantially horizontally extending circular cylinder closed at both ends. A passageway 102 is defined between the level of the inlet 104 and outlet 106 with media particles 110 forming a bed through which liquid must travel from the inlet 104 to the outlet 106. A collector trough 114 is a foraminous tube which extends longitudinally along the top of the container and connects to the outlet 106. A gas injection manifold 116 including a plurality of lateral tubes 120 connects to an intake line 124 and is located below the level of the particles 110 which form the bed. Liquid is removed through a drain outlet (not visible) which connects to a drain line 130. The operating controls and mode of operation for the apparatus shown in FIG. 9 are similar to those discussed above in relation to FIGS. 1 and 8.

Yet another embodiment is shown in FIG. 10 wherein a filter apparatus 136 includes a vessel 138 having a wall 140 in the shape of a rectangular cylinder. Adjacent to the vessel 138 is a headwater compartment 142 which receives water to build up a head sufficient for moving the water upwardly through the filter bed. The bottoms of the headwater chamber 142 and the vessel 138 are interconnected to provide an inlet 144 for water to enter the vessel. An outlet 146 is provided near the top of the vessel 140 with a bed of buoyant media particles 150 being located between the inlet 144 and outlet 146. A trough-type collector 154 lies parallel to a wall of the vessel 138. Air injection apparatus 156 are provided below the bed along with a drain outlet 158 and drain line 160.

FIG. 10 illustrates some of the specific advantages of the present invention. Water delivered to the filtering system shown collects in the headwater chamber 142 and is free to rise or fall independently of the source of water. The chamber 142 is constructed so that water cannot flow back from the chamber 142 into upstream apparatus to cause backups and overflows.

The open top of the apparatus shown in FIG. 10 accommodates a movable bridge mechanism 164 which can travel across the entire surface of the filter and which supports apparatus that depends into the water inside the vessel 140. In the illustrated embodiment a siphon-type sludge removal device of a type described in U.S. Pat. No. 4,094,785 to Booty, is carried by the bridge 164. The use of such a device would be awkward or impossible if the filter vessel were closed at the top or if the bed of media particles 150 was retained above or below a horizontal screen.

FIG. 11 shows an apparatus similar to the one illustrated in FIG. 10 and corresponding components are marked with similar reference numerals. The apparatus of FIG. 11, however, includes multiple filter vessels 138a-138d which share common walls. These multiple cells are connected in parallel and can operate together. Advantageously, flow through any individual filter can be halted during cleaning or maintenance of a particular cell while uninterrupted flow continues through the others.

Figure 12:
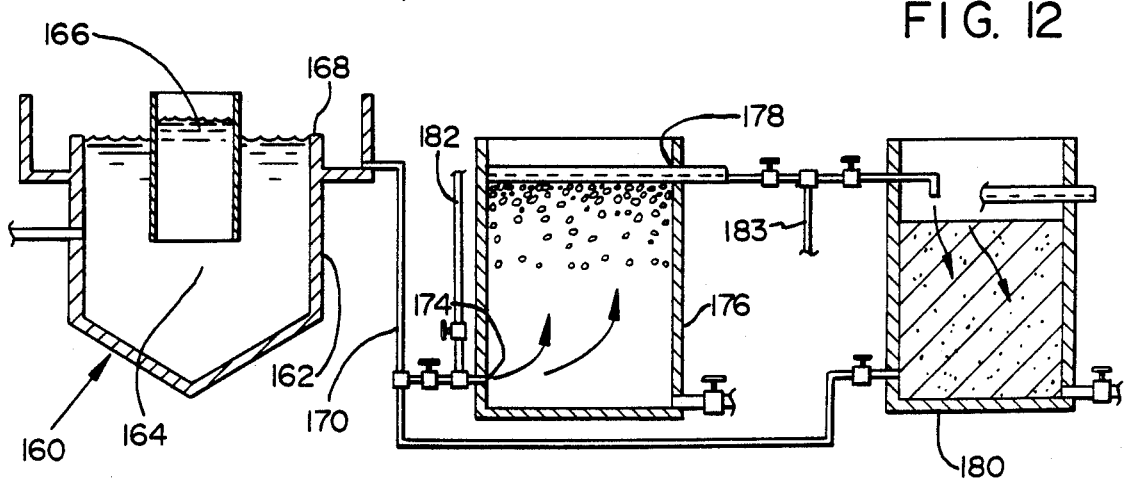
FIG. 12 is a schematic diagram showing a water purification system according to the present invention including a clarifier tank, and both upflow and downflow filtration units.

Water Filtration System of FIG. 12

The present invention further comprises other multi-unit systems for the purification of water containing suspended impurities. Such systems are illustrated by FIG. 12. A clarifier tank 160 has a wall 162 which defines a settling zone 164. Inlet means 166 deliver a stream of water with suspended solids into the settling zone 164 wherein the water is partially clarified by settling. Partially clarified water leaves the clarifier tank 160 by means of an outlet, illustrated in FIG. 12 as a weir 168.

Water passing over the weir 168 is delivered to a headwater container such as a pipe 170 wherein its level can, to some extent, vary independently of the level of the liquid in the clarifier. The pipe 170 delivers partially clarified water to the inlet 174 of an upflow filter vessel 176 which defines a vertical passageway for water between the inlet 174 and an outlet 178 located above the inlet. Buoyant media of tne type previously described is located in the vessel in an amount sufficient to form a floating filtration bed. Gravity urges water to flow from the pipe 170 into the vessel 176 and through the bed so long as the level of water in the pipe 170 is greater than the level of water in the filter vessel 176.

Another advantageous system illustrated by FIG. 12 has side-by-side upflow and downflow filter vessels 176, 180. These may or may not share a common wall. Water which leaves the filter vessel 176 through the outlet 178 flows into the top of the downflow filter where the water is finished by flowing downwardly through sand and some other nonbuoyant media. The arrangement is ideal to minimize energy consumption because the driving force which raises liquid through the filter vessel 176 is all that is necessary to supply influent to the downflow filter 180, even if the filters 176, 180 are built to the same elevation and located alongside each other on level ground. Chemical compounds to aid filtration, particularly in the downflow filter 180, can be added either upstream or downstream of the upflow filter. Thus, in FIG. 12, coagulants, filter conditioners, pH adjustment chemicals and the like can be added through either an upstream line 182 or a downstream line 183.

It can further be seen from FIG. 12 that a comprehensive water purification system comprises a clarifier, followed by an upflow and then a downflow filter to make maximum use of the available head and minimize or avoid the cost of incorporating and operating pumping mechanisms. A very fine quality water is produced by such a three stage system. And, the system is very compact since only a small difference in height is required between the units to accomplish operation entirely by gravity.

Figure 13:
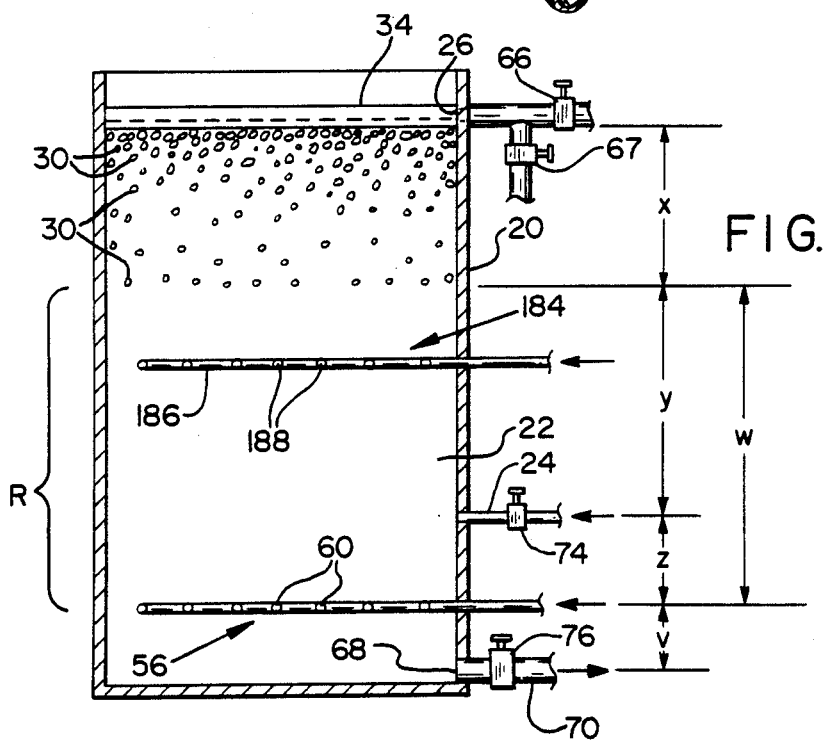
FIG. 13 is a sectional side elevation of a filter according to the present invention especially suited for filtering water containing cellulosic fibers or other suspended solids which tend to form a mat on the influent side of a filter bed.

Filter of FIG. 13

It is also a discovery that certain upflow filters can be used to solve specific, difficult filtration problems. FIG. 13 shows an apparatus according to the invention specifically adapted for use in filtering liquids containing cellulosic fibers or other material which forms a mat as the suspending liquid flows through bedded filter media. The apparatus of FIG. 13 is very similar to that shown in FIG. 1 so that both figures contain a number of corresponding reference numerals. The apparatus of FIG. 13 can employ filter media having an effective size of up to twenty millimeters. Media of larger effective size clogs less rapidly so the use of media of an effective size between ten and twenty millimeters is advantageous if the liquid to be filtered contains fibers or other solids which form a mat. A water injection means 184 is located about six to twelve inches below the bed of media particles 30 for directing jets of water into the bed to break up the mats of fiber which form on the bottom of the bed. Pressurized water is supplied to a distribution pipe 186 having a number of nozzles 188, preferably directed horizontally or upwardly.

The pipe 188 can be fixed or, as an alternative, may comprise a rotor having an interior cavity which connects to the nozzles. In the illustrated embodiment, water is supplied to the cavity through a central vertical shaft and means are provided to turn the rotor so that the jets move along a horizontal path to break up any mat which forms. The procedure for operation using this embodiment is more fully explained below.

OPERATION

While it is believed the general operation of the invention will be understood from the previous description of the apparatus, various aspects of the operation, particularly the filter cleaning procedures, are explained as follows.

In each embodiment, the bed is established by providing the desired amount of particulate filter media inside a vessel and then filling the vessel with water so that a floating bed is formed. Next, water to be filtered is introduced into the inlet of the vessel and flowed upwardly through the bed to the outlet where filtered water is collected.

Periodically, when flow through the bed drops off or suspended solids break through, it is necessary to clean trapped impurities from the bed. To accomplish the cleaning, a stream of gas bubbles is distributed uniformly into water at a location upstream of the bed. As the air bubbles move into the bed, the average density of fluid in the bed is reduced to the point where particles in the bed descend. As particles descend, the bed expands and impurities trapped during filtration are released so that they can be washed out of the filter vessel.

There are two ways to discharge separated impurities from the filter vessel. One way, described in reference to the apparatus of FIG. 12, is to close the valve 66 which connects to the finished water line and to open the valve 67 which connects to a drain line. While air expands the bed, water is allowed to continue moving upwardly therethrough, carrying with it separated impurities. The valve 76 remains closed so that water laden with separate solids flows into the collector 34 and through the valve 67 to the drain. Normal filtration is resumed by stopping the air flow and allowing any residual solids to flow through the drain valve 67. As soon as water of sufficient clarity is being collected, the drain valve 67 is closed and valve 66 is reopened.

Another method for discharging separated impurities from the vessel is to drain water form the bottom of the vessel at a rate substantially equal to the rate of flow through the inlet while gas bubbles are being introduced into the water. This halts the flow of water through the outlet, without closing a valve on the outlet or substantially lowering the level of liquid in the vessel. Preferably, the draining rate and influent rate are automatically sensed and matched so that the height of liquid inside the vessel is maintained within a predetermined range.

If the liquid being filtered contains fiber or other materials which tend to form a mat on the filter media, the cleaning process will further include the step of directing jets of water into the mat sufficiently to disrupt the mat, preferably while draining water from below the bed so that the mat is moved downwardly and disintegrated as it passes through the level of the water jets. Such draining can be accomplished by opening the valve 76 in the case of the apparatus of FIG. 12 so that the bed of media particles 30 push the mat downwardly past the distribution pipe 186. The disintegrated mat pieces fall to the bottom of the vessel and are carried out through the drain line 70.

The operation of the present invention will further be understood from the following examples.

EXAMPLE 1

Tests were conducted to determine the suitability of apparatus and process of the present invention or use for the filtration of effluent from activated sludge sewage treatment plants. The apparatus tested was generally as shown in FIG. 1. Certain of the tests were conducted in a filter column three inches in diameter and ten feet high. Other vessels having a square cross section sixteen inches on a side and eight feet high were also used. During the tests, filtered influent was fed to the bottom of each column and effluent collected at the top. The effluent collector was a trough covered with No. 16 wire screen to prevent the loss of media. A drain line was provided at the base of the columns and air for cleaning was supplied through ¼ inch tubing located at a distance below the bed.

Separate tests were conducted using polyethylene pellets and polypropylene pellets for filter media particles:

a. The polyethylene pellets were the more spherical in shape and had a very smooth surface. Sieve analysis showed this test media to have an effective size of 2.9 millimeters and a uniformity coefficient of about 1.2. Specific gravity of the beads was 0.96.

b. The polypropylene media had a rough surface and were angularly shaped. Specific gravity of the polypropylene was 0.90. Pellets had an effective size of about 3.5 millimeters and a uniformity coefficient of about 1.8.

In comparing the two types of media, it was found that the polyethylene media was more sensitive to flow rate. Specifically, it was inefficient to operate a polyethylene media bed at a rate of higher than 10 gpm per square foot. At that rate, no more than about 30% of suspended solids could be removed. A 50% removal of solids required reducing the flow rate to 6 gpm per square foot or less. The results were much better when the polypropylene media was used, most likely due to the irregular shape of the particles which increased the interstitial volume of the bed. Fifty percent suspended solids removal could be achieved even at flow rates of twenty gpm per foot square.

Beds ranging in depth from three to seven feet were tested. Suspended solid removal was significantly lower when a bed of three feet was used. A substantial increase in efficiency was used when the bed depth was increased to five feet. But, operation at a depth of seven feet produced little or no improvement over filters containing five feet of media.

The above test results and efficiency percentages were determined when the influent contained less than 10 mg/l of suspended solids, typical for the sewage treatment plants where testing occurred. However, when the suspended solids content was increased to 56 mg/l for a short period, the effluent from a filter containing the ploypropylene media was essentially unchanged, displaying a removal efficiency of about 94%. It thus appears that removal efficiency will increase with increasing influent solids content so that the above figures concerning removal efficiency are for comparison purposes only.

Tests further demonstrated that the media beds could be cleaned effectively with only a small addition of air properly applied at the bottom of the filter. Air was injected into a liquid below the bed at a sufficient distance that when the upwardly travelling mixture of air and water entered the bed, particles in the lower part of the bed would descend, apparently due to a reduction in fluid density, to about the level of the air inlet. The result was an expansion of the bed and release of trapped impurities due to the increase in the distance between media particles and enhanced fluid flow therethrough.

To achieve such bed expansion, it was necessary to reduce the density of the liquid by an amount sufficient to overcome the buoyancy of the media. The volume ratio of air to water needed to match the specific gravity of the liquid to the media is about 0.1 to specific gravity of the media. For example, if the media has a specific gravity of 0.9, the ratio of air to water needed to counteract the force of buoyancy is about 0.1 to 0.9 or 1/9. This is calculated on the following basis:

$$\rho_m = (\rho_w/\rho)\rho + (\rho_a/\rho)\rho_a$$

$m$, and $a$ are specific gravities of mixture, water and air respectively, $$\rho = \rho_a + \rho_w$$

$p_a$ is the air fraction in the pore; and $p_w$ is the water fraction in the pore.

Since $p_a$ is much less than $p$, the above equation may be approximated to:

$$\rho_m = [\rho_w/(\rho_w + \rho_a)]$$

For a buoyant media having a specific gravity of 0.9

$$\rho_m < 0.9,$$

for bed expansion.

Therefore, a limiting value of:

$$\rho_w/(\rho_w + \rho_a) = 0.90, \text{ for } \rho = 1$$

Or:

$$p_w = 0.90\,(P_w + p_a)$$

$$(1 - 0.90)p_w = 0.90\,p_a$$

$$p_w/p_a = 0.90/0.10 = 9$$

Thus, the maximum water/air ratio for bed expansion is: about 9 to 1.

Tests showed that for a seven foot column of water containing a five foot buoyant media bed, expansion would occur in about one minute when air was added at the base of the column at a rate of about 1 cubic foot per minute per square foot of filter area regardless of media size. Thus, the energy expenditure for operating air pumps to clean buoyant media by this method is minimal.

This is in sharp contrast to energy expenditure requirements to clean a conventional rapid sand or like heavy media filter by air scouring during backwashing. For example, to obtain equivalent cleaning of a heavy media bed using air scouring, it would be necessary to supply about three cubic feet of air per minute per square foot of filter media while backwashing with water at between about fifteen and forty-five gallons per minute depending on the size and type of media.

While the solids removal efficiency of tested buoyant media filters would vary depending upon bed depth, flow rate and influent characteristics, it was found that the average solids retaining capacity for polypropylene media was about 0.11 pounds per square foot per inch of headloss increase, which was about ten fold higher than for a conventional heavy filter media. Using the polypropylene media, an exceptional 50% solids removal could be achieved at a rate of 20 gallons per minute per square foot with a five foot bed.

EXAMPLE 2

In another set of experiments filter columns 18 inches in diameter and ten feet high were arranged generally as the apparatus shown in FIG. 1. Submersible pumps installed in the final clarifier of the sewage treatment plant at Philomath, Ore. were used to provide secondary clarifier effluent for filtration.

Comparison tests were conducted to determine the size of screen suitable for use on the effluent collector of the filter. The tests showed that No. 8 or No. 10 screen is the optimum choice for use with a filter in this situation. If the filter is upwashed for cleaning so that washing waste is discharged by way of the effluent collector, the screens would become clogged. But, clogging is cleared by spraying the collector screen with water as shown in FIG. 4. If cleaning was accomplished using balanced influent and drain flows, no cleaning of the collector screen was required except for the occasional removal of slime.

A single quarter inch air orifice supplied 2.4 cfm of air (1.36 cfm per square foot) during cleaning, which was sufficient to cause bed expansion in the eighteen inch circular column. The minimum air requirement was about 1 cfm per square foot. Using the single air injector, the whole four foot high bed could be expanded within a minute. The air distribution in a larger filter will be less ideal; but 2 cfm per square foot would be adequate for most larger filters.

Using the filters, tests were conducted to compare methods for cleaning buoyant media beds:

a. Bottom Draining Through Screen.

A wash cycle was started by closing the influent valve 74 and lowering the water level in the passageway 22 to about six inches below the effluent collector 34. Then air was introduced at a rate of about 1 cfm per square foot for one to one and a half minutes. After that, the drain valve 76 was opened to allow approximately four feet of water to drain from the column through a No. 4 screen placed over the drain outlet 68 to prevent media loss. Then the column was refilled with influent water and air applied followed by a repetition of the draining.

As shown in Table I, the total amount of solids in the wash out of one filter drain was relatively low. I.e., only 0.06 pounds per square foot were drained whereas 0.48 pounds per square foot were collected during filtration. Even after a second draining sifnificant amounts of solids remained in the filter medium. The inadequacy of this cleaning method was further evidenced by the relatively rapid increase of headloss in filter runs conducted after cleaning according to this method.

TABLE I

| Wash Waste Solids Bottom discharge through drain screen at 7.9 gpm/sq. ft. with influent and air shut off. ||
|---|---|
| Time (min.) | Suspended Solids (mg/l) |
| 0–1 | 268 |
| 1–2 | 114 |
| 2–3 | 102 |
| 3–4 | 91 |
| 4–5 | 76 |

TABLE I-continued

| Wash Waste Solids Bottom discharge through drain screen at 7.9 gpm/sq. ft. with influent and air shut off. ||
|---|---|
| Time (min.) | Suspended Solids (mg/l) |
| 5–6 | 58 |
| 6–7 | 50 |
| 7–8 | 49 |
| 8–9 | 49 |
| Total | 857 |

Total solids drained = 0.06 lb/sq. ft.
Total solids filtered = 0.48 lb/sq. ft.

b. Discharge Through Effluent Collector.

In this method, the washing cycle was started by closing the influent valve 74 and lowering the water level to about six inches below the effluent collector 34. Air was introduced for about a minute and a half or until the bed was fully expanded. Then, influent valve 74 was opened while the flow of air remained on so that washing waste was collected through the effluent collector 34 and passed to a waste line via the valve 67.

When the filter bed was washed according to this process, more solids were washed out within the same time interval as compared to a washing with process "a." Table II shows the wash out solids profile for filter cleaning according to this method.

TABLE II

| Wash Waste Solids Discharge through effluent collector at 11.3 gpm/sq. ft. with both influent and air on. ||
|---|---|
| Time (min.) | Suspended solids (mg/l) |
| 0–1 | 1,035 |
| 1–2 | 364 |
| 2–3 | 255 |
| 3–4 | 205 |
| 4–5 | 144 |
| Total | 2,003 |

Total solids discharged = 0.19 lb/sq. ft.
Total solids filtered = 0.47 lb/sq. ft.

Although good solids removal was achieved by this method, significant clogging of the effluent screen was experienced due to the presence of fibrous material in the wash water. The clogging was alleviated by spray washing as illustrated in FIG. 4.

It was a possible drawback of this cleaning method that some portion of media near the top of the bed might be restrained by the effluent collector 34 from free expansion when the collector 34 is used for collecting and washing waste. But, such a problem is likely to occur only when the influent flow rate is high.

c. Bottom Draining Without Screen.

The same procedure was followed as mentioned in paragraph "a" above. However, no screen was present over the drain and the drain rate was increased substantially. It took about one half minute to drain out three feet of water which was equivalent to an average rate of 25 gallons per minute per square foot. For each draining, the maximum amount of water to be drained out was limited by the depth of the tank and the media.

Figure 14:
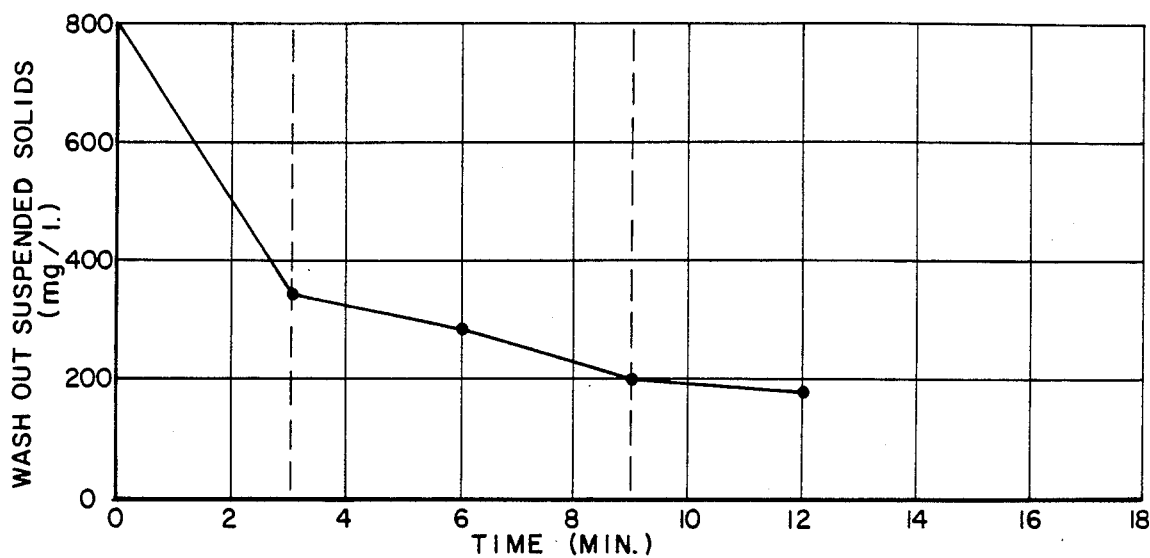
FIG. 14 is a graph showing a wash waste profile of a filter according to the present invention.

With the screen absent, the drain valve 76 was closed before any media reached the drain line 70. After draining, it took about two and one half minutes to refill the tank with influent at a rate of about eight and one half gallons per minute per square foot so that each drain-refill cycle took about three minutes. About four cycles were required for complete washing. The typical wash out profile shown in FIG. 14 illustrates that removal of the drain screen produced some improvement in media cleaning. This drain-refill method, however, would require complicated control apparatus or very diligent operators.

d. Drain the Wash Waste with Both Influent and Air on Without Drain Screen.

In this procedure waste was effectively drained through the drain line 70 while influent continued to flow through the inlet 24 and air was applied continuously. For successful operation, the piping was arranged substantially as illustrated in FIG. 1 with the air distributor at an elevation at least twelve inches, and preferably fifteen inches, above the invert elevation of the drain pipe. In other words, the dimension v in FIG. 13 is at least twelve inches. The region R should be large enough to provide for at least 50% expansion of the bed to achieve optimum cleaning. In other words, the dimension of w shown in FIG. 13 is at least 50% of dimension x for a vertically cylindrical filter vessel. Satisfactory results could be obtained if the space provided for expansion was at least 40% of the bed volume, i.e. w=40% x in FIG. 13. To achieve any meaningful bed expansion, the unobstructed expansion space must be at least 10% of the volume of the bed, i.e. w=10% x in FIG. 13. Most preferably, the influent should be applied to the filter at a distance y about two feet below the bottom of the media with the influent inlet 24 located at a vertical distance z above the air distributor 56, preferably of at least one foot.

The wash procedure was started by adjusting the drain valve 76 to maintain a draining rate equal to the influent rate through inlet 24 as previously described. Automatic controls would maintain a constant water level in the filter during washing. Once balance flow is established, the air valve is opened to allow air to enter the bed to cause expansion. Air is introduced at a rate of about 1 cubic foot per minute for each square foot of bed cross-sectional diameter. Operation is continued in this mode until water passing through the drain line 70 is substantially clear. Since the inlet and drain flows are balanced, operation is very simple; and no screens need be positioned over the inlet 24 or drain outlet 56. Thus, clogging problems are entirely eliminated.

In some instances, a very small amount of media could escape to the drain at the start of the wash cycle if some aglomerates of solids and media happened to fall below the level of the air distributor 56 before breaking up. To prevent such loss of media, the wash cycle may be started with the influent valve 74 and drain valve 76 closed. The air is applied for about one minute to expand the bed and then the valves 74 and 76 opened.

Specific cleaning tests were conducted with filters that had previously been operated at 8.5 gpm per square foot for aobut 20 hours. Total solids filtered were estimated to be about 1.5 pounds per square foot.

Figure 15:
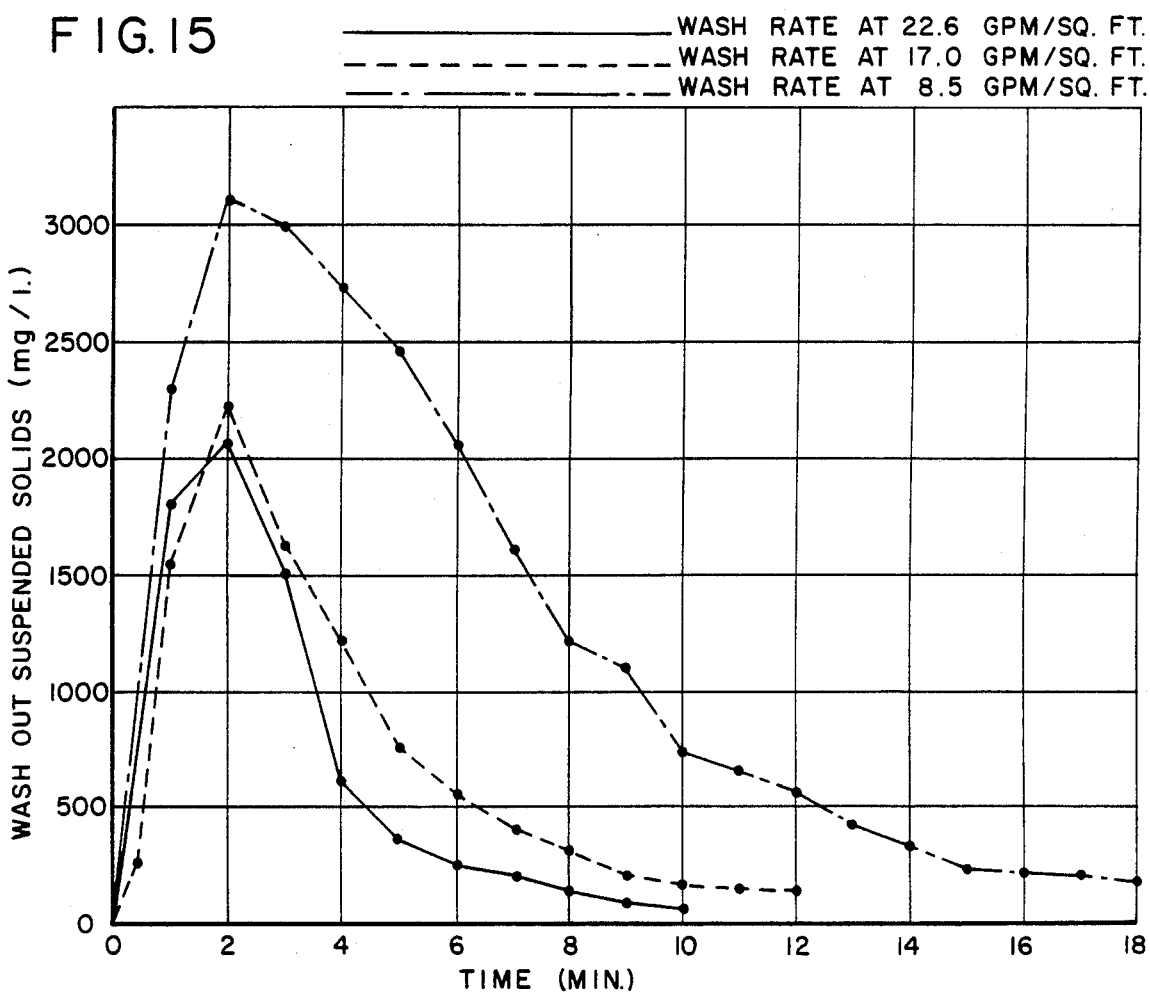
FIG. 15 is a graph showing wash waste profiles of another filter according to the present invention.
Figure 16:
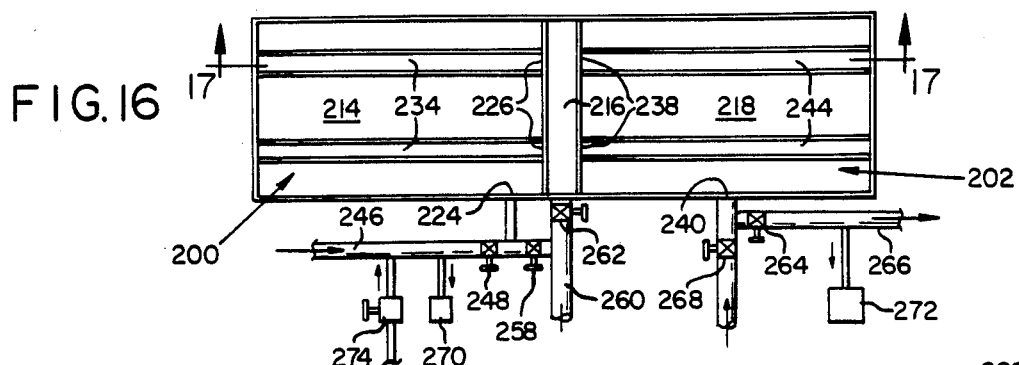
FIG. 16 is a top plan view of a water treatment system in accordance with the invention.

As shown by the draining waste profiles of FIG. 15, such a filter was cleaned adequately within 10 minutes at the highest washing rate, although the wash out solids had not fully reached the turbidity level of the influent. A small amount of residual solids left in the system was tolerable and sometimes could be beneficial for ripening of the filter bed. The required wash time was shortest at the highest wash rate of 22.6 gallons per minute per square foot. The required time for washing also varied as a function of the total amount of solids removed during the filtration.

In addition to the washing tests, a brief test of the filtration capability was made at a filter rate of 36 gallons per minute per square foot. At this rate, 50% removal efficiency was achieved for suspended solids of good filterability. Thus, a filter rate higher than 20 gpm per square foot is feasible under certain circumstances.

However, for polishing secondary clarifier effluent, the filtration rate should not exceed 20 gpm per square foot at peak flow. At that rate, a bed comprising five feet of polypropylene media appears to be adequate; but a shallower bed could be used if the filtration rate were lower.

It was generally observed that, when the influent had a solids concentration higher than 200 or turibity higher than 100, the filter could not be cleaned adequately by using influent as wash water. The filter effluent or other water sources should be used instead.

EXAMPLE 3

To determine the suitability of filters according to this invention for the filtration of water containing cellulose fiber or other materials which tend to mat and clog a filter bed, tests were made using upflow filters with buoyant media on paper mill effluent, brown suspension from pulp plants, suspensions of recycled short fibers and final effluent from aeration lagoons. The test apparatus comprised filter columns three inches in diameter and then feet high, generally arranged as shown in FIG. 13. The media depth varied from eighteen inches to 84 inches among the test runs. Influent was provided to the filter vessel by a submersible pump.

a. A substantial amount of testing was done on paper mill effluent since this liquid has the greatest potential for reuse. A major portion of the paper mill effluent comes from the recirculated water of paper machines. The main constituent of the waste solids is fibrous materials, particularly cellulose fibers. The particular paper mill effluent filtered in the tests was at a temperature of about 105° F. and contained fibers of various lengths which were able to pass through 3/16 inch holes. Suspended solids concentration of the influent varied from 108 to 1,617 milligrams per liter, the average being about 690 milligrams per liter. Settlable solids varied from 32 to 320 mg/l and averaged at around 140 mg/l after thirty minutes settling.

Using polypropylene media of the type previously described, the removal efficiency of filters tested was over 98%. However, the fibers accumulated very rapidly at the lower surface of the media and formed a mat about one half inch thick every fifteen to thirty minutes. Operating at constant pressure of 3.2 psi, the flow rate would initially be as high as twenty gpm per square foot, but would decline to about two gpm per square foot within thirty minutes. During that thirty minute period, the total volume of water filtered was equivalent to a run at a constant rate of about six gpm per square foot. The headloss would reach about seven feet in thirty minutes.

In order to provide a practical filter, various methods were attempted to extend the length of the run by periodically breaking up the mat which formed in the bottom of the media bed. Mechanical raking, water jetting and air bumping all proved to be less than satisfactory. Because the media particles were tightly packed; mechanical raking was difficult to accomplish. Water jetting would disrupt the mat but could not release it from the media surface; and air bumping could expand or agitate the media but had little effect on the mat.

It was discovered, however, that cleaning could be effectively accomplished by partially draining the vessel 20 through the drain outlet 68 every fifteen to thirty minutes and simultaneously directing water jets produced by the nozzles 188 into the mat.

For this purpose, the surface wash system 184 should be located at about six to twelve inches below the bottom of the unexpanded bed. During the simultaneous drainings and jettings, preferably regulated by automatic controls, the water level is lowered by about twelve inches, or until the lower bed boundary has passed to below the level of the nozzles.

The water jetting commences while the mat and media bed are still located about six inches above the nozzles 188. With continued draining, the mat passes downwardly through the level of the water distributor 134 where the water jets break it up. Still further draining would lower media particles 30 into the jets which would cause agitation and facilitate the release of solids from lower portions of the bed. This would make the eventual filter washing at the end of a run easier to accomplish.

Using this mat disintegrating technique, the filter can run for approximately three hours. At the end of that time, the filter is washed by following one of the procedures described in Example 2.

b. Brown Suspension from Pulp Plant Was Also Tested.

This water source contained about 1700 mg/l of usable fibrous material. Operating at six gpm per square foot, the test filter was able to reduce the suspended solids to 50 mg/l. The settlable solids in the influent water were 120 mg/l after thirty minutes of settling. Effective cleaning required the same procedure previously described for operation with paper mill effluent.

c. The tested effluent containing short fibers had a relatively low solids concentration of about 300 mg/l.

The fibers in the test samples were shorter than those which were present in the paper mill effluent and readily penetrated the filter.

Operating at five gpm per square foot, about 47-57% removal of suspended solids was achieved without chemical addition. When 30 mg/l of alum and 0.3 mg/l of 985N were added, the removal efficiency was increased to 60-86% for a filter employing a five foot bed.

d. Tests Were Conducted on Aerated Lagoon Effluent.

This material comprised effluent from the paper and pulp plant after settling in a clarifier and biological treatment in aerated lagoons.

The lagoon effluent had a temperature of around 80° F. and suspended solids of about 2040 mg/l. About 40% removal was achieved at a flow of 50 gpm per square foot. This was comparable to the removal experienced with domestic waste water and described in previous examples.

Filter System of FIGS. 16 through 19

Figure 17:
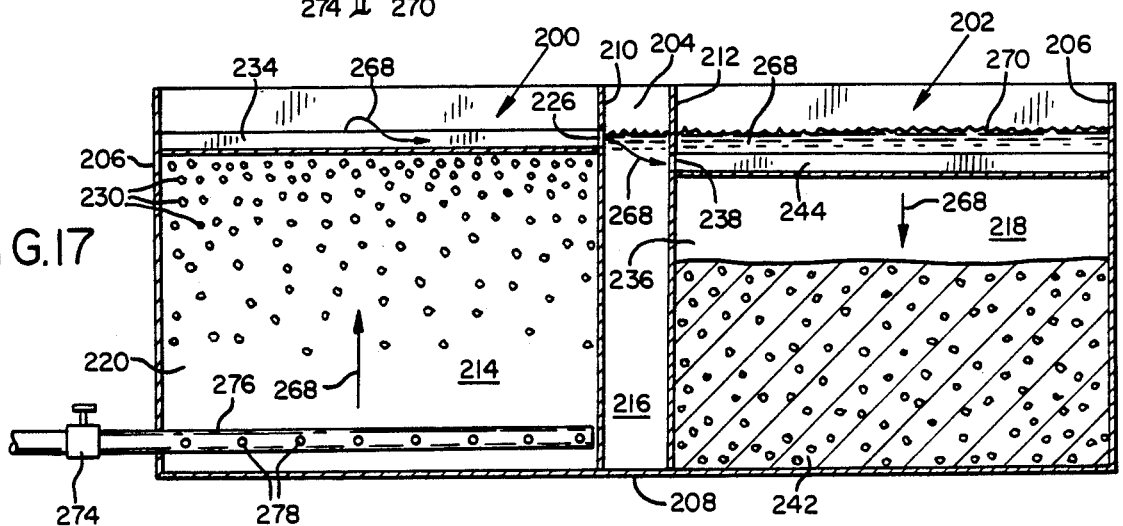
FIG. 17 is a vertical section view of the system of FIG. 16, taken along line 16—16 thereof, and showing water being treated.
Figure 18:
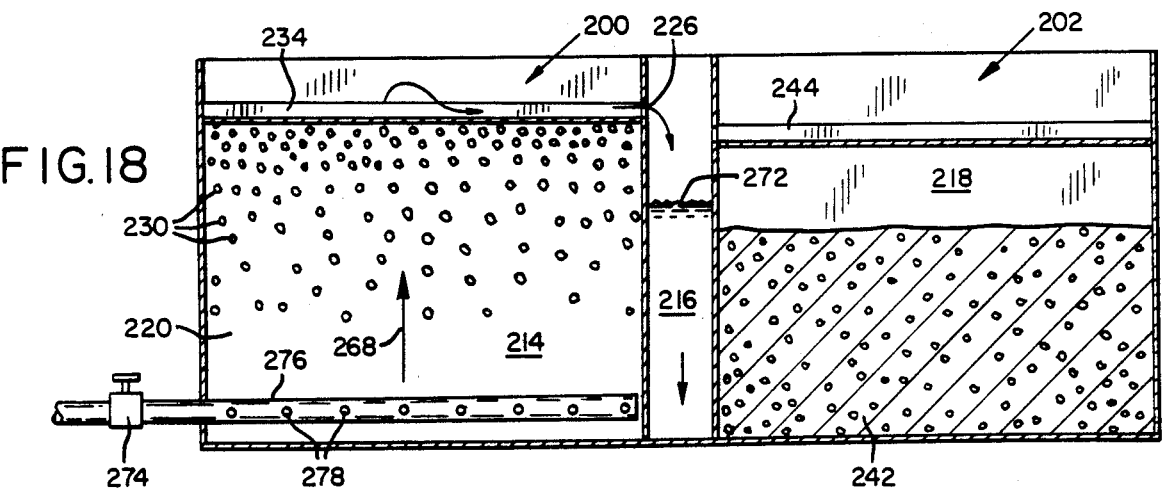
FIG. 18 is a vertical section view of the system of FIG. 16, taken along line 16—16 thereof, and showing the buoyant media filter being cleaned.
Figure 19:
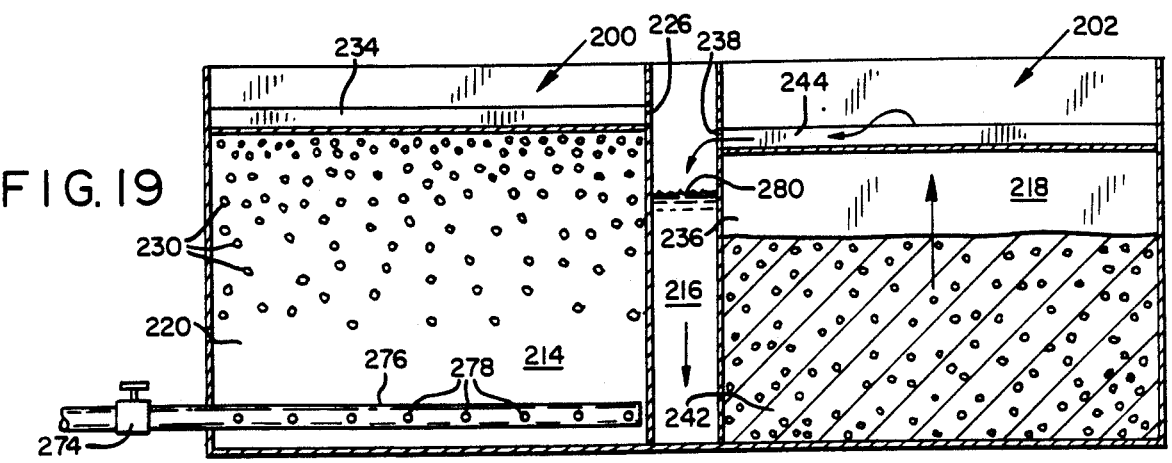
FIG. 19 is a vertical section view of the system of FIG. 16, taken along line 16—16 thereof, and showing the nonbuoyant media filter being cleaned.

With reference to FIGS. 16 through 19, a water filtration system is shown having an upflow buoyant media filter stage 200 in series with a downflow nonbuoyant media filter stage 202. As shown in FIG. 17, the system comprises a hollow main body formed of upright side and end walls 204, 206 and a base 208. First and second upright, spaced apart divider panels 210, 212 subdivide the interior of the main body into a first upflow filter compartment 214, a central compartment or backwash well 216, and a third downflow filter compartment 218.

The upflow filter compartment 214 provides an internal passageway 220 for water moving upwardly therethrough. A raw water inlet 224 (FIG. 16) is provided near the base of the compartment 214 for supplying influent water to the passageway 220. Outlets 226 (FIGS. 16 and 17) are provided through divider panel 210 near the top of the compartment 214. Filtered water from the passageway 220 flows through these outlets 226 and into the intermediate well 216.

Located between the inlet 224 and outlets 226 is a bed of buoyant media particles 230, such as previously described, on which impurities collect as water to be filtered moves upwardly through the bed. Water is filtered by passing it upwardly through the bed of particles 230 and is collected in a pair of horizontal collector troughs or apparatus 234 which deliver the filtered water to the outlets 226. A number of exemplary collector apparatus have been described above.

The downflow filter compartment 218 provides an internal passageway 236 for water moving therethrough. Inlets 238 are provided through the divider panel 212. These inlets communicate from the backwash compartment 216 to the downflow filter compartment 218. Inlets 238 are located at an upper region of the compartment 218, but below the elevation of the outlets 226 of the first filter stage. Partially treated water from the upflow filter compartment 214 and backwash compartment 216 flow through inlets 228 to the passageway 236. An outlet 240 (FIG. 16), located near the base of the compartment 218, is provided for removing the completely filtered water from the passageway 236.

Located between the inlets 238 and outlet 240 is a bed of nonbuoyant media particles 242 which filters impurities as water moves downwardly through the bed. Preferably, bed 242 comprises a mixed media filter, such as shown in U.S. Pat. No. 3,343,680. Conventional water collector lines are positioned at the lower region of the bed and lead to the water outlet 240. In addition, horizontal collector apparatus, such as troughs 244, receive the water from the respective inlets 238. The collectors 244 may be similar to, but are positioned at an elevation below, the collectors 234.

Raw water to be treated is fed by conduit 246, through an open valve 248, and to the inlet 224 of the buoyant media filter compartment. At this time, the valve 258 in a line leading from conduit 246 to a waste disposal line 260 is closed. In addition, a drain valve 252 is closed to block a conduit leading from a drain at the bottom of the compartment 216 to the waste disposal line. Also, at this time, a valve 264 in the effluent line 266 from the outlet 240 of the downflow filter compartment is open to permit the egress of treated water from the system. Finally, a valve 268 shuts off a flow of backflush water to the outlet 240 of the downflow filter compartment.

Under these operating conditions, raw water entering the inlet 224 flows, as indicated by arrows 268 in FIG. 17, upwardly through the buoyant media filter, into the troughs 234, through the central well 216, into the troughs 244, and then through the downflow filter to the effluent outlet line 266 of the system. Because of head losses in the downflow filter, the water level during normal operation of the system, as indicated at 270, is such that the troughs 244 are submerged.

Turbidity and other characteristics of the raw water may be monitored upstream of the filter compartment 214. In addition, these characteristics are also monitored in the effluent line 266. Meters or other conventional monitoring devices 270, 272 are provided for this purpose. One or more chemical feed devices 274 is provided for injecting chemicals, such as coagulant, directly into the raw water stream as it passes through the conduit 246. This monitoring of water characteristics facilitates close control of chemical doses to minimize waste of expensive treatment chemicals. For example, an operator can adjust the rate of coagulant supply from chemical feed device 274 in the event of a variation in the turbidity of the influent or effluent water.

It has been found that lower coagulent doses are required for separation of solids using a buoyant media filter as disclosed, rather than in a settling-type clarifier. Furthermore, with the upflow buoyant media and downflow nonbuoyant media systems, flocculation and clarification of the raw water takes place within the buoyant media filter. This eliminates the need for a settling-type clarifier and results in a much more compact system.

It has been found that the bulk of the filtration takes place in the buoyant media filter. Depending upon water conditions, typically anywhere from 70% to 95% of suspended material is removed from the raw water by the buoyant media filter. Therefore, it is desirable to clean the buoyant media filter more frequently, and independently of, the nonbuoyant media filter. This increases the amount of time that the system may operate between runs, that is, between cleaning of the nonbuoyant media filter. It should be noted that a water treatment plant would typically include two or more filter systems of the type shown in FIG. 16. Therefore, while one such system is being cleaned, the others are operational so that the water treatment plant continues to treat raw water.

It is also been discovered that partial cleaning of the buoyant media filter is all that is required to maintain the system in continued operation. During such partial cleaning, some of the deposited solids are carried out from the filter, while others are merely redistributed within the filter bed. Eventually, a steady state or equilibrium condition is reached wherein each cleaning cycle removes a fixed amount of solids from the buoyant filter bed.

Because partial cleaning is all that is required, less time, flush water, and air are required during the cleaning process. In addition, there is less waste water from cleaning that has to be disposed of.

As another advantage from the partial cleaning, flocculation within the buoyant media filter is enhanced by the contact with previously deposited solids which remain in the filter, even after it is cleaned. Thus, fewer floc chemicals are required. Also, it is advantageous to leave a certain amount of deposited solids in a buoyant media filter, as the solids reduce the size of the pores of the filter and assist filtration.

Typically, partial cleaning is accomplished sporadically, or at periodic predetermined time intervals, or in response to conventional pressure sensors which sense a change in head loss through the buoyant media filter.

In a typical application, following partial cleaning of a buoyant media filter and at a flow rate of 10 gallons per minute per sq. ft. of filter area, the head loss is from 0.7 to 1 foot. When sufficient solids have been deposited so as to result in an increase in head loss to, for example, four pounds, then partial cleaning of the filter is accomplished as follows. The influent valve 248 is temporarily closed while the valve 262 leading from compartment 216 to the sewer is opened. As a result, the water level in compartment 216 drops to a level such as indicated at 272 in FIG. 18. In addition, an air supply valve 274 is opened so that air bubbles are supplied to upflow filter compartment 214 through a conduit 276 and perforated air delivery laterals 278. A vigorous stream of bubbles may be utilized, which causes expansion of the buoyant media bed 230, as previously described. After about 30 seconds, the influent valve 248 is reopened so that the buoyant media bed is flushed with both influent and air. This continues for approximately one minute. Thereafter, the air valve 274 is closed, and influent water is fed into the buoyant media filter compartment to refill the volume occupied by the air. Flushing with influent continues, with the waste being carried out from the compartment 216 to the sewer. Eventually, when the head loss has dropped to the starting condition (i.e. 0.7-1 lb. ), the drain valve 262 is closed, and the system resumes normal operation, as shown in FIG. 17. The entire partial cleaning of the buoyant media bed takes only approximately five minutes, and thus is relatively fast.

Complete cleaning of the nonbuoyant media filter is performed at about every fifth cleaning of the buoyant media filter. In cleaning the nonbuoyant media filter, the drain valve 262 (FIG. 16) is opened, the backflush water valve 268 is opened, and the effluent line valve 264 is closed. Under these conditions, the water level in central compartment 216 drops, as indicated at 280 in FIG. 19. Backflush water passes upwardly through the nonbuoyant media and expands the bed. The backflush water passes into the troughs 244, then to compartment 216 and to the waste water line 260. Conventional agitation devices may be utilized to facilitate expansion and cleaning of the nonbuoyant media bed.

The system of this invention uses a common waste water valve 262 (FIG. 16) and common trough or well in cleaning both the nonbuoyant and buoyant media beds, thereby eliminating an otherwise expensive duplication of equipment. The buoyant media bed may be cleaned simultaneously with the cleaning of the nonbuoyant media bed, or the beds may be cleaned independently, in the manner described above.

In contrast to the slow water treatment rates expected with buoyant media filters, the series arrangement of an upflow buoyant media filter followed by a downflow nonbuoyant media filter enables operation of a treatment plant at 10 gallons per minute per sq. ft. of filter areas. This compares with an industry standard of 5 gallons per minute per sq. ft. Therefore, an extremely efficient and economical water treatment system is provided by this invention.

While I have shown and described the preferred embodiments of my invention, it will be apparent to those skilled in the art that changes and modifications may be made without departing from my invention in its broader aspects. I therefore intend the appended claims to cover all such changes and modifications as follow the true spirit and scope of my invention.

I claim:

1. A filter system which includes;
a hollow main body and first and second upright spaced apart walls separating the main body into first, second, and third compartments, the first compartment comprising an upflow filter vessel which defines a vertical passageway for water and the third compartment comprising a downflow filter vessel, the second compartment comprising an intermediate cleaning well means for receiving cleaning liquid and removed deposited solids from the upflow and downflow filter vessels, the upflow filter vessel having an upflow filter inlet, having an upflow filter outlet above the buoyant filtration bed and communicating through the first wall to the cleaning well means, the downflow filter vessel having a downflow filter inlet communicating through the second wall to the cleaning well means at an elevation below the upflow flter outlet and having a downflow filter outlet;

an amount of buoyant particulate filter media in the upflow filter vessel sufficient to form a buoyant filtration bed in the passageway;

an amount of nonbuoyant particulate filter media in the downflow filter vessel sufficient to form a nonbuoyant filtration bed therein extending above the downflow filter outlet;

cleaning means including a drain outlet communicating with the cleaning well means, drain means for selectively opening the drain outlet to drain the cleaning well means, buoyant filtration bed cleaning means for selectively supplying air and cleaning liquid upwardly through the buoyant filtration bed, nonbuoyant filtration bed cleaning means for selectively supplying cleaning liquid upwardly through the nonbuoyant filtration bed, the drain means closing the drain outlet during water filtration such that water entering the upflow filter inlet passes through the buoyant filtration bed, the upflow filter outlet, the cleaning well means, the downflow filter inlet, the nonbuoyant filtration bed, and the downflow filter outlet, the drain means opening the drain outlet at times when the buoyant filtration bed cleaning means is supplying cleaning liquid to the buoyant filtration bed so as to drain cleaning liquid and removed solids which pass from the buoyant filtration bed through the upflow filter outlet and into the cleaning well means as the buoyant filtration bed is cleaned, the drain means also opening the drain outlet at times when the nonbuoyant filtration bed cleaning means is supplying cleaning liquid to the nonbuoyant filtration bed so as to drain cleaning liquid and removed solids which pass from the nonbuoyant filtration bed through the downflow filter inlet and into the cleaning well means as the nonbuoyant filtration bed is cleaned.

2. A filter system according to claim 1 in which the buoyant filtration bed cleaning means comprises means for partially cleaning the buoyant filtration bed multiple times between cleanings of the nonbuoyant filtration bed by the nonbuoyant filtration bed cleaning means.

3. A filter system comprising:
an upflow filter vessel defining a vertical passageway for water and having an upflow filter inlet;
an amount of buoyant particulate filter media in the vessel sufficient to form a buoyant filtration bed in the passageway with an unobstructed region of sufficient volume below the bed to allow the bed to expand during cleaning to the extent that trapped solids can be released from the entire bed;
a downflow filter vessel having a downflow filter outlet;
an amount of nonbuoyant particulate filter media in the downflow filter vessel sufficient to form a nonbuoyant filtration bed therein extending above the outlet,
the upflow and downflow filter vessels being in communication in such a manner that water entering the upflow filter vessel inlet flows upwardly through the buoyant filtration bed, then downwardly through the nonbuoyant filtration bed, then through the downflow filter outlet,
the buoyant filtration bed having particles of a density less than the density of water and greater than the density of an admixture of water and gas bubbles; and
gas injection means comprising stationary vented lateral gas delivery tubes located in the upflow filter vessel upstream of the unobstructed region and means for selectively supplying gas to the gas delivery tubes, the injection means being adapted periodically to dispense gas bubbles throughout water below the buoyant filtration bed in such a manner that at least some of the particles will move and the buoyant filtration bed will expand and, due to such motion and expansion, solids trapped by such bed during filtration will be released from the buoyant filtration bed.

4. A filter system comprising:
an upflow filter vessel defining a vertical passageway for water and having an upflow filter inlet;
an amount of buoyant particulate filter media in the vessel sufficient to form a buoyant filtration bed in the passageway with an unobstructed region of sufficient volume below the bed to allow the bed to expand during cleaning to the extent that trapped solids can be released from the entire bed;
a downflow filter vessel having a downflow filter outlet;
an amount of nonbuoyant particulate filter media in the downflow filter vessel sufficient to form a nonbuoyant filtration bed therein extending above the outlet,
the upflow and downflow filter vessels being in communication in such a manner that water entering the upflow filter vessel inlet flows upwardly through the buoyant filtration bed, then downwardly through the nonbuoyant filtration bed, then through the downflow filter outlet,
the buoyant filtration bed having particles of a density less than the density of water and greater than the density of an admixture of water and gas bubbles; and
gas injection means comprising a hollow rotor located in the upflow filter vessel upstream of the unobstructed region, the rotor having at least one vent for supplying gas into the water from the interior of the rotor, and means for rotating the rotor to move the vent through the water, the injection means being adapted periodically to dispense gas bubbles throughout water below the buoyant filtration bed in such a manner that at least some of the particles will move and the buoyant filtration bed will expand and, due to such motion and expansion, solids trapped by such bed during filtration will be released from the buoyant filtration bed.

5. The filter system: of claim 3 or 4 wherein the unobstructed region has at least forty percent of the volume of the buoyant filtration bed.

6. The filter system of claim 5 wherein the unobstructed region has at least fifty percent of the volume of the buoyant filtration bed.

7. A filter system according to claim 3 or 4 in which the buoyant filtration bed is made of particles having a specific gravity no less than 0.80, a uniformity coefficient no greater than 2.0 and a sphericity of less than 0.7; and the system also includes means for preventing the particles from being carried out of the upflow filter vessel with water flowing upwardly therethrough.

8. A filter system according to claim 3 or 4 including water injection means located in the upflow filter vessel upstream of the buoyant media filtration bed for directing at least one jet of water toward the bottom of the buoyant filtration bed to periodically agitate at least a bottom region of the buoyant filtration bed to release solids trapped by such bed during filtration.

9. The filter system of claim 8 wherein the water injection means comprises a rotor having an interior cavity connected with at least one nozzle opening so that when the cavity is connected to a source of pressurized water, a jet of water, which extends toward the bottom of the buoyant filtration bed, is produced through the opening; and means for rotating the rotor to move the jet relative to the buoyant filtration bed.

10. A filter system according to claim 3 or 4 in which the buoyant filtration bed is made of particles having a specific gravity less than the specific gravity of water and no less than 0.80.

11. A filter system comprising:

an elongated, horizontally extending circular cylindrical upflow filter vessel which is closed at both ends, which has an upflow filter inlet and outlet and which defines a vertical passageway for water in a closed compartment that is greater in length than in height, an amount of buoyant particulate filter media in the vessel sufficient to form a buoyant filtration bed in the passageway;

a downflow filter vessel having a downflow filter outlet, the upflow filter outlet communicating with the downflow filter vessel, an amount of nonbuoyant particulate filter media in the downflow filter vessel sufficient to form a nonbuoyant filtration bed therein extending above the outlet;

a liquid collector positioned within the vessel at a location near the top thereof so as to extend into the buoyant filtration bed to receive liquid which flows upwardly through the buoyant filtration bed and to conduct the liquid to the upflow filter outlet such that water entering the upflow filter vessel inlet flows upwardly through the buoyant filtration bed, then downwardly through the nonbuoyant filtration bed, then through the downflow filter outlet, the buoyant filtration bed having particles of a density less than the density of water and greater than the density of an admixture of water and gas bubbles; and gas injection means located in the upflow filter vessel upstream of the buoyant filtration bed, the injection means being adapted periodically to dispense gas bubbles throughout water below the buoyant filtration bed in such a manner that at least some of the particles will move and the buoyant filtration bed will expand and, due to such motion and expansion, solids trapped by such bed during filtration will be released from the buoyant filtration bed.

12. A filter system of claim 11 wherein the collector comprises a foraminous tube which extends longitudinally along the top of the compartment and connects to the upflow filter vessel outlet.

13. A filter system comprising:

an upflow filter vessel defining a vertical passageway for water and having an upflow filter inlet;

an amount of buoyant particulate filter media in the vessel sufficient to form a buoyant filtration bed in the passageway;

a downflow filter vessel having a downflow filter outlet;

an amount of nonbuoyant particulate filter media in the downflow filter vessel sufficient to form a nonbuoyant filtration bed therein extending above the outlet;

manifold means with at least its lowest portion positioned below the level of water within the upflow filter vessel, the manifold means having a plurality of horizontally spaced collection orifices positioned below the level of water within the upflow filter vessel and above the level of the lowest portion of the manifold means, the manifold means communicating with the downflow filter vessel to deliver water thereto from the upflow filter vessel in such a manner that water entering the upflow filter vessel inlet flows upwardly through the buoyant filtration bed, then downwardly through the nonbuoyant filtration bed, then through the downflow filter outlet;

a plurality of screen cages, one of which is located in the flow path of water from the passageway to each orifice, to prevent particles of the buoyant filtration bed from clogging the orifices and from being carried into the manifold; and cleaning means for cleaning the buoyant filtration bed and the nonbuoyant filtration bed, the cleaning means comprising means for selectively delivering air and cleaning liquid upwardly through the buoyant filtration bed to remove deposited solids from such bed and for selectively delivering cleaning liquid upwardly through the nonbuoyant filtration bed to remove deposited solids from such bed, cleaning vessel means coupled to the upflow filter vessel and to the downflow filter vessel for receiving cleaning liquid and removed deposited solids from the upflow and downflow filter vessels, and drain means for draining the cleaning vessel means.

14. A method of filtration of water comprising:

positioning an amount of buoyant particulate filter media in an upflow filter vessel to form a buoyant filtration bed in the upflow filter vessel;

positioning an amount of nonbuoyant particulate filter media in a downflow filter vessel to form a nonbuoyant filtration bed in the downflow filter vessel flowing water upwardly through the buoyant filtration bed;

after water has flowed upwardly through the buoyant filtration bed, flowing the water downwardly through the nonbuoyant filtration bed;

selectively disbursing gas bubbles into water at a location upstream of the buoyant filtration bed to cause at least some of the particles of the buoyant filtration bed to move and the buoyant filtration bed to expand and release solids trapped in such buoyant filtration bed during filtration; and flowing buoyant filtration bed cleaning water upwardly through the upflow filter vessel while the bed is expanded to carry the separated solids away from the upflow filter vessel.

15. A method according to claim 14 including the steps of cleaning the nonbuoyant filtration bed from time to time; and cleaning the buoyant filtration bed plural times between cleanings of the nonbuoyant filtration bed.

16. A method according to claim 14 including the step of feeding chemicals, such as coagulants, directly into a stream of water to be treated which enters the upflow filter vessel.

17. The method of claim 14 further comprising:

selectively flowing nonbuoyant filtration bed cleaning water through the nonbuoyant filtration bed to carry away solids trapped in such nonbuoyant filtration bed during filtration;

delivering the nonbuoyant filtration bed cleaning water and the buoyant filtration bed cleaning water containing the separated solids to a common waste water disposal trough;

diverting the nonbuoyant filtration bed cleaning water and the buoyant filtration bed cleaning water to a disposal site.

18. The method of claim 17 further comprising flowing water through the waste water disposal trough as the water passes from the upflow filter vessel to the downflow filter vessel.

19. The method of claim 14 further comprising at least initially halting the flow of liquid through the buoyant filtration bed during the dispursing of gas bubbles.

20. A method for filtering water according to claim 14 comprising the additional step of periodically directing at least one jet of water toward the bottom of the buoyant filtration bed to agitate at least a bottom region of the bed to release solids trapped by the bed during filtration.

* * * * *